(12) United States Patent
Chien et al.

(10) Patent No.: US 11,796,902 B2
(45) Date of Patent: Oct. 24, 2023

(54) LIGHT SOURCE MODULE

(71) Applicant: Qisda Corporation, Taoyuan (TW)

(72) Inventors: Chih-Shiung Chien, Taoyuan (TW);
Ming-Kuen Lin, Taoyuan (TW);
Tsung-Hsun Wu, Taoyuan (TW);
Yi-Ling Lo, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 0 days.

(21) Appl. No.: 17/730,321

(22) Filed: Apr. 27, 2022

(65) Prior Publication Data
US 2022/0390820 A1    Dec. 8, 2022

(30) Foreign Application Priority Data
Jun. 3, 2021    (CN) .......................... 202110617298.0

(51) Int. Cl.
*G03B 21/20* (2006.01)
*G02B 27/14* (2006.01)

(52) U.S. Cl.
CPC ......... *G03B 21/204* (2013.01); *G02B 27/141* (2013.01); *G03B 21/2013* (2013.01); *G03B 21/2066* (2013.01)

(58) Field of Classification Search
CPC .............. G03B 21/204; G03B 21/2013; G03B 21/2066; G02B 27/141
USPC .......................................................... 353/31
See application file for complete search history.

(56) References Cited

U.S. PATENT DOCUMENTS

2021/0124246 A1\*    4/2021    Ikeda ................... G02B 26/008

\* cited by examiner

*Primary Examiner* — Jerry L Brooks

(57) ABSTRACT

A light source module including first and second light sources, first and second wavelength conversion units, and first and second light splitting units is provided. The first light source emits a first light having a first wavelength. The first wavelength conversion unit converts at least one portion of the first light into a first converted light having a second wavelength. The second light splitting unit allows the lights having the second and third wavelengths to travel through and reflects the light having the first wavelength. The second light source emits a second light having the first wavelength. The second wavelength conversion unit converts at least one portion of the second light into a second converted light having the third wavelength. The first light splitting unit is disposed between the first and second wavelength conversion units and reflects the first wavelength and allows the second wavelength to travel through.

18 Claims, 4 Drawing Sheets

LIGHT SOURCE MODULE

This application claims the benefit of People's Republic of China application Serial No. 202110617298.0, filed Jun. 3, 2021, the subject matter of which is incorporated herein by reference.

BACKGROUND OF THE INVENTION

Field of the Invention

The invention relates in general to a light source module.

Description of the Related Art

A conventional light source module provides at least one color light. Generally speaking, the light source of the light source module mostly emits a monochromatic light. To enrich the colors of the light emitted from the light source module, normally a wavelength conversion unit is required to change the wavelength of the light emitted from the light source, and more light splitting units are required to obtain the desired color lights using the properties such as transmittance and reflection. However, these elements will increase the size of the light source module. Therefore, it has become a prominent task for the industries to provide a new light source module capable of resolving the above problems.

SUMMARY OF THE INVENTION

The invention is directed to a light source module capable of resolving the above problems encountered in the prior art.

According to an embodiment of the present invention, a light source module is provided. The light source module includes a first light source, a first wavelength conversion unit, a second light splitting unit, a second light source, a second wavelength conversion unit and a first light splitting unit. The first light source is configured to emit a first light having a first wavelength. The first wavelength conversion unit is disposed opposite to the first light source and is configured to convert at least one portion of the first light into a first converted light having a second wavelength. The second light splitting unit is disposed opposite to the first wavelength conversion unit and is configured to allow one of the first wavelength and the second wavelength to travel through and allow the other one to be reflected and is configured to allow one of the first wavelength and the third wavelength to travel through and allow the other one to be reflected. The second light source is disposed opposite to the second light splitting unit and is configured to emit a second light having the first wavelength. The second wavelength conversion unit is disposed opposite to the second light splitting unit and is configured to convert at least one portion of the second light into a second converted light having a third wavelength, wherein the third wavelength, the second wavelength and the first wavelength are different from each other. The first light splitting unit is disposed between the first wavelength conversion unit and the second wavelength conversion unit and is configured to reflect the first wavelength and allow the second wavelength to travel through.

The above and other aspects of the invention will become better understood with regard to the following detailed description of the preferred but non-limiting embodiment(s). The following description is made with reference to the accompanying drawings.

DETAILED DESCRIPTION OF THE INVENTION

Figure 1:
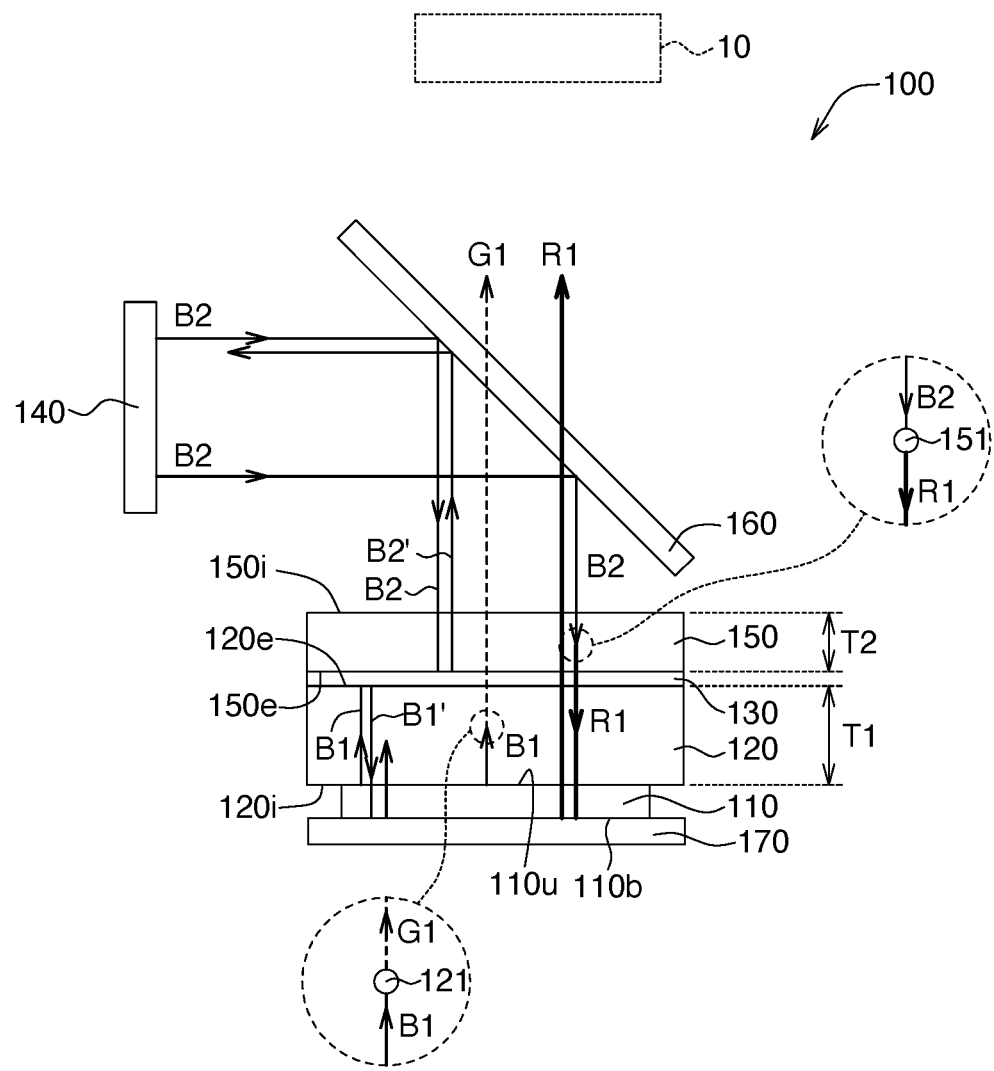
FIG. 1 is a schematic diagram of a light source module according to an embodiment of the present invention.

Referring to FIG. 1, a schematic diagram of a light source module 100 according to an embodiment of the present invention is shown. The light source module 100 can be applied to a device requiring light source, such as a projector, an illuminator, a display or other types of devices. In terms of the application to projection devices, the light source module 100 may also be referred as a light combining module.

The light source module 100 includes a first light source 110, a first wavelength conversion unit 120, a first light splitting unit 130, a second light source 140, a second wavelength conversion unit 150, a second light splitting unit 160 and a reflection unit 170.

The first light source 110 is configured to emit a first light having a first wavelength B1. The first wavelength conversion unit 120 is disposed opposite to the first light source 110 and is configured to convert at least one portion of the first light B1 into a first converted light G1 having a second wavelength. The first light splitting unit 130 is disposed between the first wavelength conversion unit 120 and the second wavelength conversion unit 150 and is configured to reflect the first wavelength and allow the second wavelength to travel through. The second light source 140 is disposed opposite to the second light splitting unit 160 and is configured to emit a second light B2 having the first wavelength. The second wavelength conversion unit 150 is disposed opposite to the second light splitting unit 160 and is configured to convert at least one portion of the second light B2 into a second converted light R1 having a third wavelength, wherein the third wavelength, the second wavelength and the first wavelength are different from each other. The second light splitting unit 160 is disposed opposite to the first wavelength conversion unit 120 and is configured to allow one of the first wavelength and the second wavelength to travel through and allow the other one to be reflected and to allow one of the first wavelength and the third wavelength to travel through and allow the other one to be reflected. In the present embodiment, the second light splitting unit 160 allows the light having the first wavelength to be reflected and allows the lights having the second wavelength and the third wavelength to travel through. As disclosed above, the first converted light G1 and the second converted light G2 are converted by two separate wavelength conversion units. Due to relative relationship between the optical elements of the light source module 100, the size of the light source module 100 is smaller.

In the present embodiment, the light having the first wavelength is such as one of red light, blue light and green light, the light having the second wavelength is such as another one of red light, blue light and green light, and the third wavelength is such as the remaining one of red light, blue light and green light. In the present invention embodiment, the light having the first wavelength, the light having the second wavelength and the light having the third wavelength are respectively exemplified by blue light, green light and red light. The first light source 110 and the second light source 140 can be realized by light emitting diodes or laser light sources.

As indicated in FIG. 1, in terms of the optical path of the first light B1, the first light B1 is outputted from the first light source 110 in an optical path through the second light splitting unit 160. The optical path sequentially passes through the first wavelength conversion unit 120 (converts the first light B1 into the first converted light G1), the first light splitting unit 130, the second wavelength conversion unit 150 and the second light splitting unit 160. After traveling through the second light splitting unit 160, the first converted light G1 is incident to a module 10, such as an illumination module or an imaging module.

As indicated in FIG. 1, in terms of the optical path of the second light B2, the second light B2 is outputted from the second light source 140 in an optical path through the second light splitting unit 160. The optical path sequentially passes through the second light splitting unit 160, the second wavelength conversion unit 150 (converts the second light B2 into the second converted light R1), the first light splitting unit 130, the first wavelength conversion unit 120, the first light source 110, the reflection unit 170, the first wavelength conversion unit 120, the first light splitting unit 130, the second wavelength conversion unit 150 and the second light splitting unit 160. After traveling through the second light splitting unit 160, the second converted light R1 is incident to the module 10.

As indicated in FIG. 1, the first light source 110 has a light emitting surface 110u and a back surface 110b opposite to the light emitting surface 110u, wherein the first light B1 is emitted from the light emitting surface 110u. The reflection unit 170 is disposed on the back surface 110b and is configured to reflect the first light B1 and the second converted light R1.

As indicated in FIG. 1, the first light source 110 and the second light source 140 are respectively located on two opposite sides of the first light splitting unit 130 for enabling the first light B1 emitted from the first light source 110 and the second light B2 emitted from the second light source 140 respectively to are incident to two opposite sides of the first light splitting unit 130.

As indicated in FIG. 1, adjacent two of the first light source 110, the first wavelength conversion unit 120, the first light splitting unit 130, the second wavelength conversion unit 150 and the reflection unit 170 contact each other, so that light loss can be reduced. In terms of relative positions, the reflection unit 170, the first light source 110, the first wavelength conversion unit 120, the first light splitting unit 130, the second wavelength conversion unit 150 and the second light splitting unit 160 are sequentially arranged in a direction from the first light source 110 towards the second light splitting unit 160 (such as in a straight-line direction).

As indicated in FIG. 1, the first wavelength conversion unit 120 has a first surface 120i and a third surface 120e opposite to the first surface 120i; the second wavelength conversion unit 150 has a second surface 150i and a fourth surface 150e opposite to the second surface 150i; the third surface 120e and the fourth surface 150e are respectively located on two opposite sides of the first light splitting unit 130. The first light B1 is incident to the first wavelength conversion unit 120 through the first surface 120i, then the first light B1 is converted into a first converted light G1 by the first wavelength conversion unit 120; the second light B2 is incident to the second wavelength conversion unit 150 through the second surface 150i, then the second light B2 is converted into a second converted light R1 by the second wavelength conversion unit 150. To summarize, the first light B1 and the second light B2 respectively are incident to two separate wavelength conversion units, then the first light B1 and the second light B2 are converted into the first converted light G1 and the second converted light R1 respectively by two separate wavelength conversion units.

the first wavelength conversion unit 120 and the second wavelength conversion unit 150 have the same wavelength conversion properties. As indicated in FIG. 1, the first wavelength conversion unit 120 includes several fluorescent particles 121 capable of exciting the light to convert the wavelength of the light. For example, the first wavelength conversion unit 120 converts the first light B1 having the first wavelength into the first converted light G1 having the second wavelength. The second wavelength conversion unit 150 includes several fluorescent particles 151 capable of exciting the light to convert the wavelength of the light. For example, the second wavelength conversion unit 150 converts the second light B2 having the first wavelength into the second converted light R1 having the third wavelength.

As indicated in FIG. 1, the thickness T1 of the first wavelength conversion unit 120 is greater than the thickness T2 of the second wavelength conversion unit 150. In an embodiment, the thickness T1 is such as 1.1~3 times of the thickness T2 and can be even larger or smaller. In terms of actual size, the thickness T1 is such as 0.15~0.3 millimeters (mm), the thickness T2 is such as 0.1 mm~0.25 mm. Since the first wavelength conversion unit 120 has a certain thickness, the length of the optical path of the first light B1' reflected reciprocally between the first light splitting unit 130 and the reflection unit 170 can be increased to increase the probability or efficiency of converting the first light B1' into the first converted light G1.

The first light splitting unit 130 can be realized by a dichroic mirror. As indicated in FIG. 1, apart from allowing the light having the second wavelength to travel through, the first light splitting unit 130 further allows the light having the third wavelength (such as the second converted light R1) to travel through. The first light B1 and the second light B2 are blocked by the first light splitting unit 130, and therefore cannot travel through the first light splitting unit 130. The first light splitting unit 130 can reflect the first light B1 and the second light B2 having the first wavelength respectively back to the first wavelength conversion unit 120 and the second wavelength conversion unit 150 and allow the first converted light G1 having the second wavelength and the second converted light R1 having the third wavelength to travel through.

For example, as indicated in FIG. 1, since the first light splitting unit 130 allows the first wavelength to be reflected, the first light B1 having the first wavelength is reflected back to the first wavelength conversion unit 120 by the first light splitting unit 130 (referred as the first light B1') to increase the probability or efficiency of converting the first light B1' into the first converted light G1. Then, after being incident to the reflection unit 170, the first light B1' is further reflected back to the first wavelength conversion unit 120 to increase the probability or efficiency of converting the first light B1' into the first converted light G1. Besides, the first light source 110 and the first wavelength conversion unit 120 are disposed between the reflection unit 170 and the first light splitting unit 130. Thus, the first light B1' can be reflected reciprocally between the first light splitting unit 130 and the reflection unit 170 to increase the probability or efficiency of converting the first light B1' into the first converted light G1.

Also, the second light B2 having the first wavelength is reflected back to the second wavelength conversion unit 150 by the first light splitting unit 130 (referred as the second light B2'). After traveling through the second wavelength conversion unit 150, the second light B2' is incident to the second light splitting unit 160, then the second light B2' is reflected off the light source module 100 from the second light splitting unit 160 or is processed by the light source module 100. Since the ratio of the amount of light of the second light B2' to the amount of light of the second light B2 is below a predetermined ratio, the light loss caused by the second light B2 is small. The predetermined ratio is such as equivalent to or smaller than 5%.

The second light splitting unit 160 can be realized by a dichroic mirror. As indicated in FIG. 1, the configuration angle of the second light splitting unit 160 is such as 45°, but the embodiments of the present invention are not limited thereto. Moreover, the first light source 110, the first wavelength conversion unit 120, the first light splitting unit 130, the second light source 140, the second wavelength conversion unit 150 and the reflection unit 170 are located on the same side of the second light splitting unit 160, therefore the second light B2, the first converted light G1 and the second converted light R1 are incident to the same side of the second light splitting unit 160.

Figure 2:
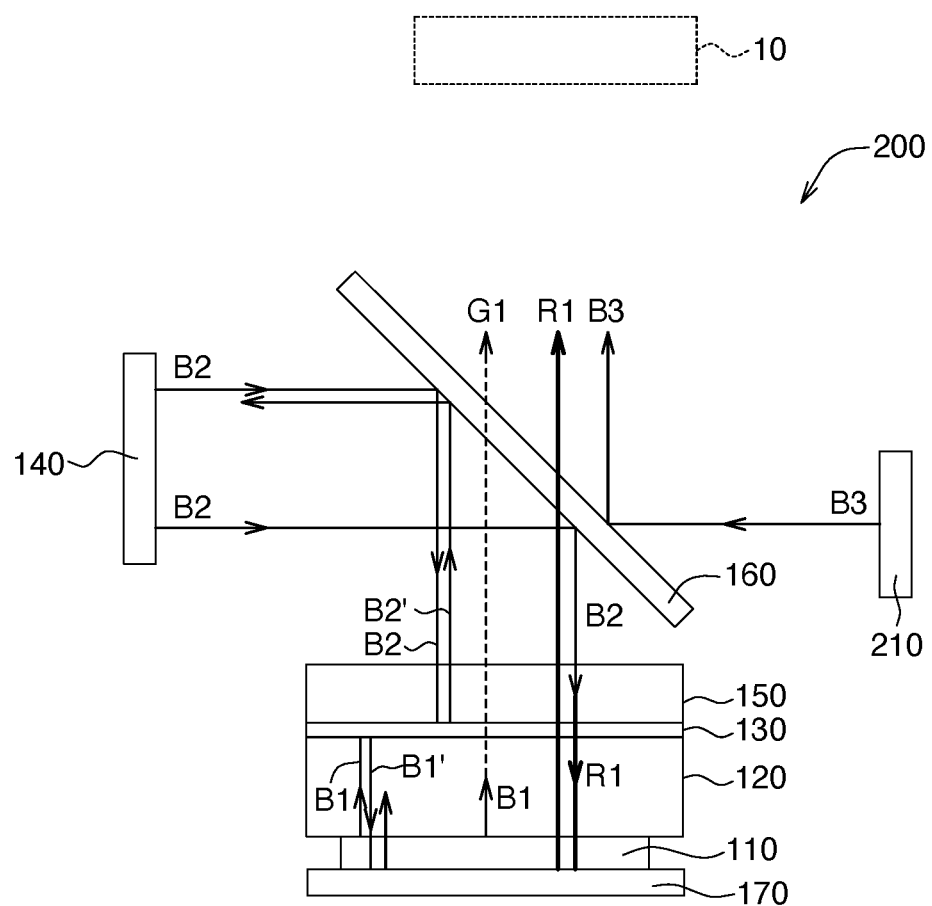
FIG. 2 is a schematic diagram of a light source module according to another embodiment of the present invention.

Referring to FIG. 2, a schematic diagram of a light source module 200 according to another embodiment of the present invention is shown. The light source module 200 includes a first light source 110, a first wavelength conversion unit 120, a first light splitting unit 130, a second light source 140, a second wavelength conversion unit 150, a second light splitting unit 160, a reflection unit 170 and a third light source 210. Technical features of the light source module 200 of the embodiments of the present invention are similar or identical to that of the light source module 100 except that the light source module 200 further includes a third light source 210.

The third light source 210 is disposed opposite to the second light splitting unit 160 and is configured to emit a third light B3 having the first wavelength. The second light splitting unit 160 configured to allow the light having the first wavelength (such as the second light B2 and the third light B3) to be reflected and allow the light having the second wavelength (such as the first converted light G1) and the light having the third wavelength (such as the second converted light R1) to travel through. After the third light B3 is reflected from the second light splitting unit 160, the third light B3 is incident to the module 10. Thus, the first converted light G1, the second converted light R1 and the third light B3 having different light colors are incident to the module 10 through the second light splitting unit 160, so that the color light provided by the light source module 200 has versatile color change.

As indicated in FIG. 2, the third light source 210 and the second light source 140 are respectively located on two opposite sides of the second light splitting unit 160, so that the third light B3 emitted from the third light source 210 and the second light B2 emitted from the second light source 140 are respectively reflected to module 10 and the second wavelength conversion unit 150 in two opposite directions.

Figure 3:
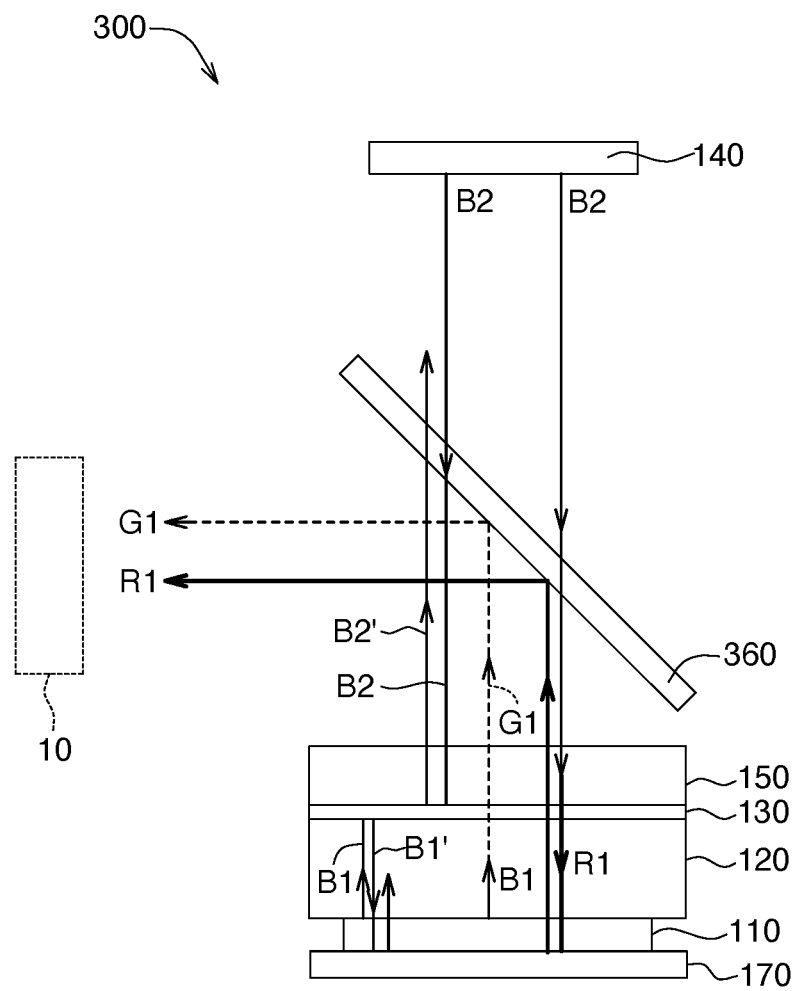
FIG. 3 is a schematic diagram of a light source module according to another embodiment of the present invention.

Referring to FIG. 3, a schematic diagram of a light source module 300 according to another embodiment of the present invention is shown. The light source module 300 includes a first light source 110, a first wavelength conversion unit 120, a first light splitting unit 130, a second light source 140, a second wavelength conversion unit 150, a second light splitting unit 360 and a reflection unit 170. Technical features of the light source module 300 of the embodiments of the present invention are similar or identical to that of the light source module 100 except that the light splitting property of the second light splitting unit 360 of the light source module 300 is different from the light splitting property of the second light splitting unit 160. The second light splitting unit 360 can be realized by a dichroic mirror.

In the present embodiment, the second light splitting unit 360 allows the light having the first wavelength (such as the second light B2 and the third light B3) to travel through and allows the light having the second wavelength (such as the first converted light G1) and the light having the third wavelength (such as the second converted light R1) to be reflected.

As indicated in FIG. 3, in the optical path of the first light B1, the first light B1 is outputted from the first light source 110 through the second light splitting unit 360 in an optical path. The optical path sequentially passes through the first wavelength conversion unit 120 (converts the first light B1 into the first converted light G1), the first light splitting unit 130, the second wavelength conversion unit 150 and the second light splitting unit 360. After having been reflected from the second light splitting unit 160, the first converted light G1 is incident to the module 10.

As indicated in FIG. 3, in the optical path of the second light B2, the second light B2 is outputted from the second light source 140 through the second light splitting unit 360 in optical path. The optical path sequentially passes through the second light splitting unit 360, the second wavelength conversion unit 150 (converts the second light B2 into the second converted light R1), the first light splitting unit 130, the first wavelength conversion unit 120, the first light source 110, the reflection unit 170, the first wavelength conversion unit 120, the first light splitting unit 130, the second wavelength conversion unit 150 and the second light splitting unit 360. After having been reflected from the second light splitting unit 160, the second converted light R1 is incident to the module 10.

Figure 4:
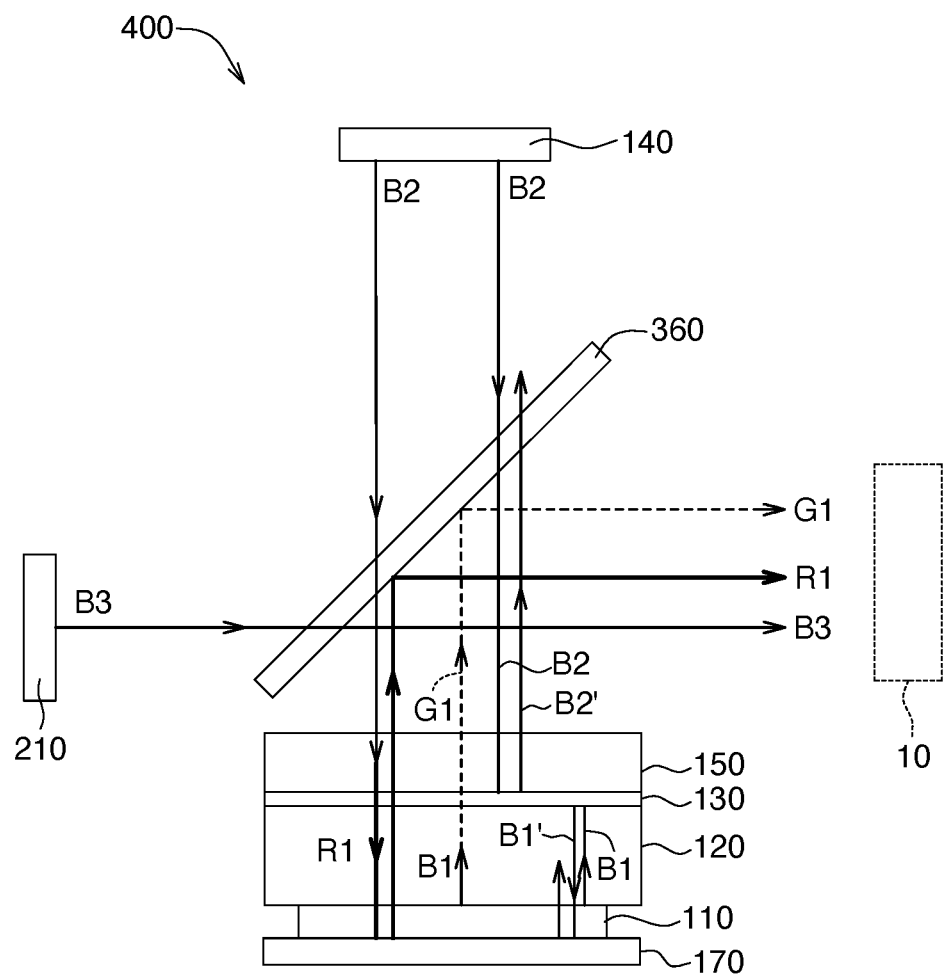
FIG. 4 is a schematic diagram of a light source module according to another embodiment of the present invention.

Referring to FIG. 4, a schematic diagram of a light source module 400 according to another embodiment of the present invention is shown. The light source module 400 includes a first light source 110, a first wavelength conversion unit 120, a first light splitting unit 130, a second light source 140, a second wavelength conversion unit 150, a second light splitting unit 360, the reflection unit 170 and a third light source 210. Technical features of the light source module 400 of the embodiments of the present invention are similar or identical to that of the light source module 300 except that the light source module 400 further includes a third light source 210.

The third light source 210 is disposed opposite to the second light splitting unit 360 and is configured to emit a third light B3 having the first wavelength. After having been reflected from the second light splitting unit 160, the third light B3 is incident to the module 10. Thus, the first converted light G1, the second converted light R1 and the third light B3 with different light colors is incident to the module 10 through the second light splitting unit 360, so that the color light provided by the light source module 400 has versatile color change.

As indicated in FIG. 4, the third light source 210 and the second light source 140 are respectively located on the same side of the second light splitting unit 360, the third light B3 emitted from the third light source 210 and the second light B2 emitted the second light source 140 are incident to the same side of the second light splitting unit 360.

To summarize, according to the embodiments of the present invention, an optical module is provided. The optical module can be applied to any device requiring the light and includes two light sources, two wavelength conversion units and two light splitting units. Two lights emitted by the two light sources respectively are converted into two converted lights having identical wavelength by the two wavelength conversion units and are outputted via one of the light splitting units. The other one of the light splitting units is located between the two wavelength conversion units for reflecting the light emitted by one of the light sources back to one of the wavelength conversion units to increase conversion efficiency.

While the invention has been described by way of example and in terms of the preferred embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A light source module, comprises:
    a first light source configured to emit a first light having a first wavelength;
    a first wavelength conversion unit disposed opposite to the first light source and configured to convert at least one portion of the first light into a first converted light having a second wavelength;
    a second light splitting unit disposed opposite to the first wavelength conversion unit and configured to allow one of the first wavelength and the second wavelength to travel through and allow the other one to be reflected and to allow one of the first wavelength and a third wavelength to travel through and allow the other one to be reflected;
    a second light source disposed opposite to the second light splitting unit and configured to emit a second light having the first wavelength;
    a second wavelength conversion unit disposed opposite to the second light splitting unit and configured to convert at least one portion of the second light into a second converted light having the third wavelength, wherein the third wavelength, the second wavelength and the first wavelength are different from each other; and
    a first light splitting unit disposed between the first wavelength conversion unit and the second wavelength conversion unit and configured to reflect the first wavelength and allow the second wavelength to travel through.

2. The light source module according to claim 1, wherein the first light splitting unit is configured to respectively reflect the first light having the first wavelength and the second light having the first wavelength to the first wavelength conversion unit and the second wavelength conversion unit and allow the first converted light having the second wavelength and the second converted light having the third wavelength to travel through.

3. The light source module according to claim 1, further comprises:
    a third light source disposed opposite to the second light splitting unit and configured to emit a third light having the first wavelength;
    wherein the second light splitting unit is configured to allow the second light having the first wavelength and the third light having the first wavelength to be reflected and allow the first converted light having the second wavelength and the second converted light having the third wavelength to travel through.

4. The light source module according to claim 3, wherein the third light source and the second light source are respectively located on two opposite sides of the second light splitting unit.

5. The light source module according to claim 1, further comprises:
    a third light source disposed opposite to the second light splitting unit and configured to emit a third light having the first wavelength;
    wherein the second light splitting unit is configured to allow the second light having the first wavelength and the third light having the first wavelength to travel through and to allow the first converted light having the second wavelength and the second converted light having the second wavelength to be reflected.

6. The light source module according to claim 5, wherein the third light source and the second light source are located on the same side of the second light splitting unit.

7. The light source module according to claim 1, further comprises a reflection unit, wherein the first light source and the first wavelength conversion unit are disposed between the reflection unit and the first light splitting unit.

8. The light source module according to claim 1, wherein the first light source has a light emitting surface and a back surface opposite to the light emitting surface, the first light is outputted from the light emitting surface, and the light source module further comprises:
    a reflection unit disposed on the back surface and configured to reflect the first light and the second converted light.

9. The light source module according to claim 1, wherein the first wavelength conversion unit has a thickness is greater than that of the second wavelength conversion unit.

10. The light source module according to claim 1, wherein the first light source, the first wavelength conversion unit, the first light splitting unit, the second wavelength conversion unit and the second light splitting unit are sequentially arranged in a direction from the first light source towards the second light splitting unit.

11. The light source module according to claim 1, wherein adjacent two of the first wavelength conversion unit, the first light splitting unit and the second wavelength conversion unit contact each other.

12. The light source module according to claim 1, wherein the first light source and the first wavelength conversion unit contact each other.

13. The light source module according to claim 1, wherein the first light source and the second light source are respectively located on two opposite sides of the first light splitting unit.

14. The light source module according to claim 1, wherein the first wavelength conversion unit has a first surface and a third surface opposite to the first surface, the second wavelength conversion unit has a second surface and a fourth surface opposite to the second surface; the third surface and the fourth surface are respectively located on two opposite sides of the first light splitting unit, the first light is incident to the first surface, and the second light is incident to the second surface.

15. The light source module according to claim 1, wherein the second light is outputted from the second light source in an optical path through the second light splitting unit; the optical path sequentially passes through the second light splitting unit, the second wavelength conversion unit, the first light splitting unit, the first wavelength conversion unit, the first light source, the first wavelength conversion unit, the first light splitting unit, the second wavelength conversion unit and the second light splitting unit.

16. The light source module according to claim 1, wherein the first light is outputted from the first light source in an optical path through the second light splitting unit, the optical path sequentially passes through the first wavelength conversion unit, the first light splitting unit, the second wavelength conversion unit and the second light splitting unit.

17. The light source module according to claim 1, wherein the second light is outputted from the second light source in an optical path through the second light splitting unit, the optical path sequentially passes through the second light splitting unit, the second wavelength conversion unit, the first light splitting unit, the first wavelength conversion unit and the first light source, the first wavelength conversion unit, the first light splitting unit, the second wavelength conversion unit and the second light splitting unit.

18. The light source module according to claim 1, wherein the first light is outputted from the first light source in an optical path through the second light splitting unit; the optical path sequentially passes through the first wavelength conversion unit, the first light splitting unit, the second wavelength conversion unit and the second light splitting unit.

* * * * *